No. 756,229. PATENTED APR. 5, 1904.
J. C. G. FRITZ.
WINDOW CLEANER.
APPLICATION FILED DEC. 5, 1902.
NO MODEL. 2 SHEETS—SHEET 2.

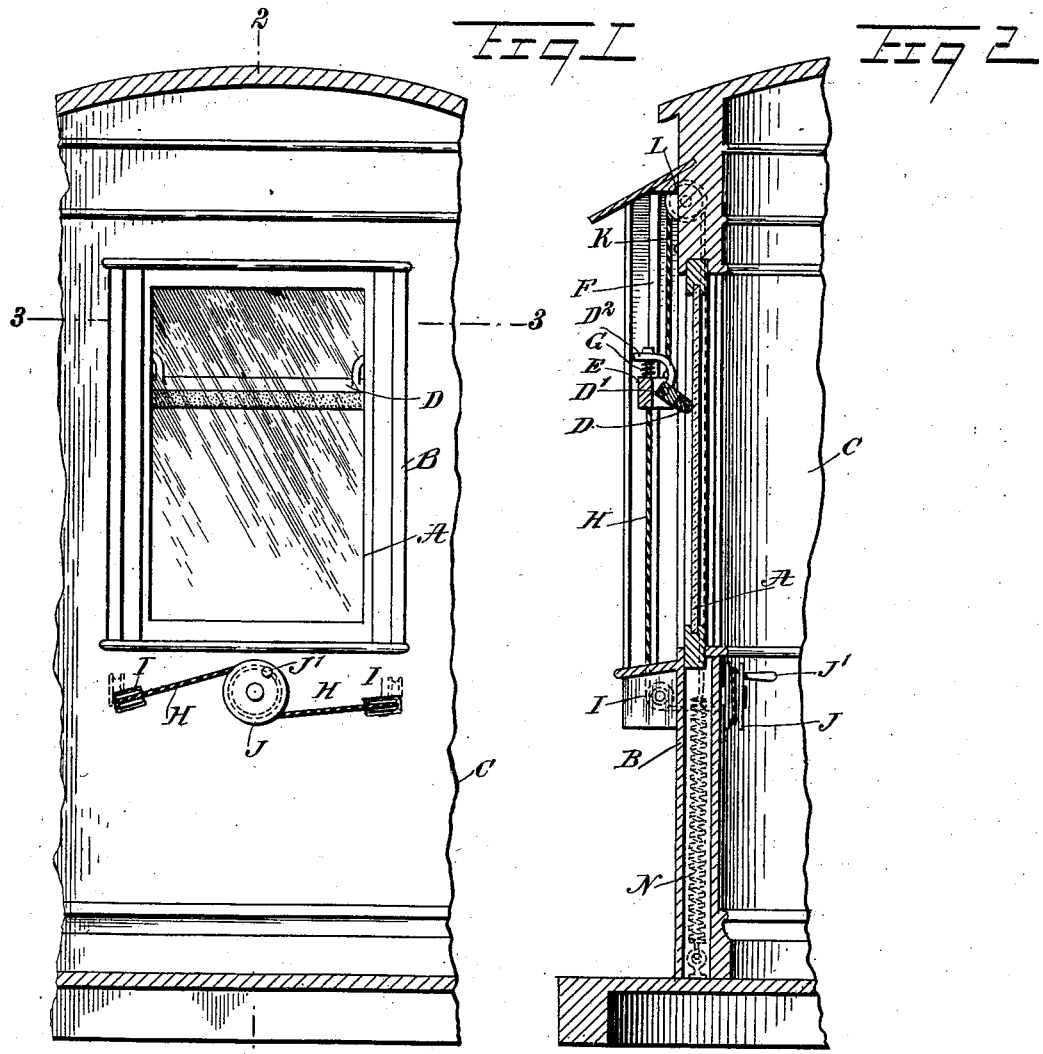

WITNESSES:
H. Walker

INVENTOR
Johannes Conrad George Fritz
BY Munn
ATTORNEYS

No. 756,229. Patented April 5, 1904.

UNITED STATES PATENT OFFICE.

JOHANNES CONRAD GEORGE FRITZ, OF NEW YORK, N. Y.

WINDOW-CLEANER.

SPECIFICATION forming part of Letters Patent No. 756,229, dated April 5, 1904.

Application filed December 5, 1902. Serial No. 133,996. (No model.)

*To all whom it may concern:*

Be it known that I, JOHANNES CONRAD GEORGE FRITZ, a subject of the German Emperor, residing in the city of New York, borough of Brooklyn, in the county of Kings and State of New York, have invented a new and Improved Window-Cleaner, of which the following is a full, clear, and exact description.

The object of the invention is to provide a new and improved window-cleaner more especially designed for use on windows of locomotive-cabs, platform-windows of street-cars, and other vehicles and arranged to permit the engineer, motorman, driver, or other person to keep the outlook-window perfectly clear from frost, moisture, dirt, and the like and permit at all times a clear view of the path in front of the vehicle to avoid collisions.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all of the views.

Figure 4:
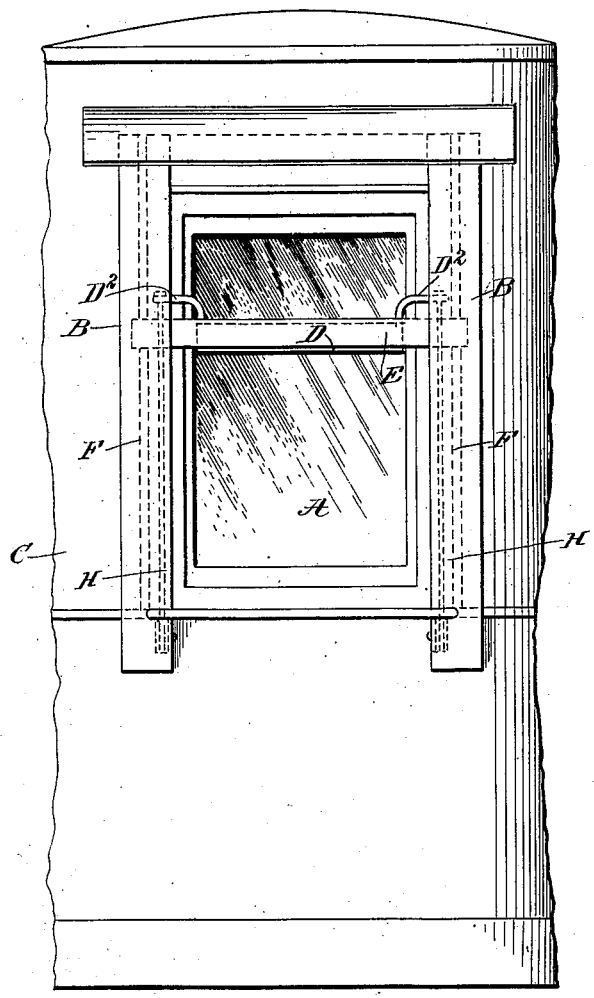
Figure 5:
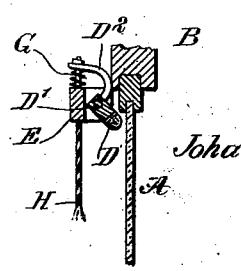

Figure 1 is a cross-section of part of a street-car, showing the cab of the motorman and also showing the improvement applied. Fig. 2 is a sectional side elevation of the same on the line 2 2 of Fig. 1. Fig. 3 is a sectional plan view of the same on the line 3 3 of Fig. 1. Fig. 4 is a front elevation of the same, and Fig. 5 is a sectional side elevation of the wiper in a normal or a resting position on the window-pane.

The window-sash A is mounted to slide vertically in the window-frame B, forming part of the cab C of a locomotive, street-car, or other vehicle on which the device is to be used. The window-cleaner for cleaning the pane of glass of the window-sash A consists, essentially, of a wiper D, made of rubber, felt, sheet metal, or other suitable material, and the said wiper is provided at its ends with trunnions D', journaled in suitable bearings on cross-head E, mounted to slide vertically in front of the window-sash A on guideways F, carried by the cab C. The wiper D is also provided with upwardly and outwardly extending arms $D^2$, pressed on by springs G, resting on the cross-head E, so as to normally hold the wiper D out of contact with the face of the window-pane, as plainly illustrated in Fig. 5.

The arms $D^2$ are connected with ropes or chains H, extending downwardly and passing over guide-pulleys I to the inside of the cab C, the cords or chains then winding on a drum J, journaled inside of the cab and provided with a handle J', adapted to be taken hold of by the engineer, motorman, driver, or other person for rotating the drum to wind up the ropes or chains H. Now when this takes place the ropes H first exert a pull on the arms $D^2$, so as to impart a swinging motion to the wiper D to move the latter in contact with the pane of glass of the window-sash A. The ropes or chains H then impart a downward-sliding movement to the wiper D and its cross-head E, so that the wiper is drawn over the face of the window-pane to clean the same of frost, moisture, dirt, or other matter that may have settled on the outer face of the window-pane. As soon as the wiper has been drawn down to the lower end of the window-pane then the operator releases the handle J' to allow the springs G to immediately draw the wiper out of contact with the surface of the window-pane, and then a spring device, presently to be described in detail, returns the cross-head E of the wiper to a normal uppermost position. (Shown in Fig. 5.)

The spring device referred to consists, essentially, of ropes or chains K, connected with the cross-head E and extending upwardly and passing over pulleys L, to then extend downward inside of the window-frame to connect with springs N, secured at their lower ends to the cab-body, as plainly indicated in Fig. 2.

It will be seen that when the cross-head E and its wiper move downward then the springs N are put under tension, and as soon as the operator releases the handle J' and the wiper D is moved out of engagement with the surface of the window-pane then the said springs N exert a pull on the ropes K to draw the cross-head E and its wiper back into an uppermost position.

From the foregoing it will be evident that when the ropes H are wound up on the drum J an initial movement is first given to the wiper D, so as to move the same in contact with the surface of the window-pane, and then the wiper and its cross-head are moved downward to draw the wiper over the surface of the window-pane for cleaning the pane.

The ropes H and springs N are arranged at the sides of the window-sash, so that the spring device does not interfere in any manner whatever with the window-sash A whenever it is desired to lower the sash for opening the window.

The device is very simple and durable in construction, can be manufactured cheaply, and can be readily applied to the cabs of locomotives, street-cars, and other vehicles.

Having thus described my invention, I claim as new and desire to secure by Letters Patent—

1. A window-cleaner forming a permanent fixture of the window, said cleaner comprising a cross-head, means connected with it for holding the same normally at one side of the window, a wiper pivotally held on the cross-head with its free edge extending toward the window, arms extending rearwardly from the wiper, compression-springs between said cross-head and said arms to hold the wiper normally out of engagement with the window, and operating means adapted to engage and pull upon the outer ends of said arms against the action of said compression-spring, whereby a pull upon said operating means first operates to overcome the force of said compression-springs, and brings the wiper into contact with the window-pane, and then carries the wiper and cross-head downward against the action of the supporting means to be returned by the same when the operating means is released.

2. A window-cleaner forming a permanent fixture of the window, said cleaner comprising a cross-head, supporting means for holding the same normally at the top of the window, a wiper pivotally held on the cross-head having one edge free and extending downwardly and forwardly toward the window, arms extending rearwardly from the wiper over the top of said cross-head, operating means attached to said arms and adapted to move the same toward the cross-head to bring the wiper into engagement with the window, and compression-springs between said arms and the cross-head to gently resist the action of the operating means upon the wiper, whereby when said means are released, the supporting means moves the cleaner to its normal position, and the compression-spring moves the wiper out of contact with the window.

3. A window-cleaner forming a permanent fixture of the window and comprising a wiper, a cross-head in which the wiper is hinged, a spring having purchase on the cross-head and bearing against the wiper to normally hold the latter out of contact with the window-pane, and means under the control of the operator and connected with the wiper, to first move the wiper into contact with the window-pane and to then draw the wiper over the surface of the window-pane, as set forth.

4. A window-cleaner forming a permanent fixture of the window and comprising a wiper, a cross-head in which the wiper is hinged, a spring having purchase on the cross-head and bearing against the wiper to normally hold the latter out of contact with the window-pane, means under the control of the operator and connected with the wiper, to first move the wiper into contact with the window-pane and to then draw the wiper over the surface of the window-pane, and a return-spring device connected with the said cross-head, to return the latter and the wiper to a normal position on the release of said means by the operator, as set forth.

5. A window-cleaner forming a permanent fixture of the window, said cleaner comprising a cross-head, a wiper pivoted thereto, a spring connected with said cross-head for supporting the same normally at the top side of the window, operating means for moving the cleaner downwardly over the window against the action of said supporting-spring, a second spring between the supporting-spring and the operating means and forming a yielding link or connection between the two, said second spring being weaker than the supporting-spring and means for utilizing the yielding of said second spring to move the wiper into engagement with the window when the operating means predominates and to move it out of engagement therewith when the operating mechanism is released.

6. A window-cleaner forming a permanent fixture of the window, said cleaner comprising a cross-head, means connected with said cross-head for holding the same normally at one side of the window, a wiper pivotally held on the cross-head and having a free edge extending downwardly and forwardly toward the window, arms extending rearwardly from the wiper over said cross-head, compression-springs between said cross-head and said arms to hold the wiper normally inclined downwardly and inwardly out of engagement with the window, and operating means adapted to engage and pull upon the outer ends of said arms against the action of said compression-springs to move the cross-head and the free edge of the wiper toward the window, whereby a pull upon said operating means first operates to overcome the force of said compression-springs and brings the wiper into contact with the window-pane, and then carries the wiper
5 and cross-head downward against the action of the supporting means to be returned by the same when the operating means is released.

In testimony whereof I have signed my name to this specification in the presence of two subscribing witnesses.

JOHANNES CONRAD GEORGE FRITZ.

Witnesses:
 THEO. G. HOSTER,
 JNO. M. RITTER.